A. Codding. Jr.
Hook & Eye.

No. 39,121. Patented July 7, 1863.

Witnesses
Frederick Curtis
H. P. Hale

Abiel Codding Jr.

UNITED STATES PATENT OFFICE.

ABIEL CODDING, JR., OF NORTH ATTLEBOROUGH, MASSACHUSETTS.

IMPROVEMENT IN HOOKS AND EYES FOR CONNECTING CORDS.

Specification forming part of Letters Patent No. 39,121, dated July 7, 1863.

*To all whom it may concern:*

Be it known that I, ABIEL CODDING, Jr., a resident of North Attleborough, of the county of Bristol and State of Massachusetts, have invented a new and useful Improvement in Hooks and Eyes for "Ladies' Pages;" and I do hereby declare the same to be fully described in the following specification and represented in the accompanying drawings, of which—

Figure 1:
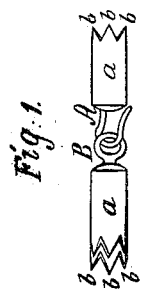
Figure 2:
Figure 3:

Figure 1 is a perspective view of a hook and eye as made in accordance with my invention. Fig. 2 is a longitudinal section of the same as applied to the two ends of a lady's page. Fig. 3 is an end view of the serrations of the tube of either the hook or the eye.

A lady's page is an elastic cord or band, used to extend the skirts of a dress in order to hold or loop the same up in a manner to prevent it from trailing in the mud or becoming spattered therewith while the wearer may be walking. The hook and the eye, therefore, as heretofore made, have each had a socket-tube extending from it, each tube being for the reception of the end of the elastic cord or band, which has been fixed in the socket either by cement or by a rivet.

My improvement consists in making the socket-tube with serrations, teeth, or prongs on that end of it which is farthest from the hook or the eye, and so that these serrations, teeth, or prongs may be bent down into the cord or band, and in this way serve to confine it to the tube.

In the drawings, A denotes a hook, and B an eye, as connected to the two extremities of a page, C, and as made with socket-tubes *a a*, each of which has a series, *b b b*, of the serrations, teeth, or prongs made on its open end, as shown in Fig. 1.

Fig. 2 represents the manner in which the serrations, teeth, or prongs are bent down into the page or cord C, which may be accomplished by nippers suitably formed for the purpose.

By this mode of making and fixing the hook or eye to the page it can be secured very readily and to great advantage.

I claim—

The improved socketed hook and eye having the socket-tubes *a* thereof provided with serrations, teeth, or prongs, arranged in the manner and for the purpose as specified.

ABIEL CODDING, JR.

Witnesses:
 R. H. EDDY,
 F. P. HALE, Jr.